3,600,419
PREPARATION OF AROMATIC ISOCYANATES
Nicholas B. Franco, North Haven, and Martin A. Robinson, Orange, Conn., assignors to Olin Corporation
No Drawing. Filed Sept. 3, 1968, Ser. No. 757,109
Int. Cl. C07c *119/04*
U.S. Cl. 260—453P                                        13 Claims

ABSTRACT OF THE DISCLOSURE

The process for preparing an organic isocyanate by reacting an organic nitro compound with carbon monoxide in the presence of a catalyst system comprised of either a mixture or a complex of nickel iodide and a Lewis base. The Lewis base is preferably a heteroaromatic nitrogen-containing compound containing between five and six members in the ring, containing no element other than nitrogen and carbon in the ring, containing no more than two nitrogen atoms in the ring, and having at least two double bonds in the ring, such as pyridine and isoquinoline. The catalyst system may also include a second component such as molybdenum trioxide or another metal oxide.

---

This invention relates to catalytic materials useful in the preparation of organic isocyanates from organic nitro compounds.

Organic isocyanates are used extensively in the preparation of urethane foams, coatings, and fibers, as well as in the preparation of insecticides, pesticides and the like.

Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Pat. No. 672,405 entitled "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanate, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated temperature and elevated pressure in the presence of a catalyst system comprised of either a mixture or a complex of nickel iodide and a Lewis base. The Lewis base is preferably a heteroaromatic nitrogen-containing compound containing between five and six members in the ring, containing no element other than nitrogen and carbon in the ring, containing no more than two nitrogen atoms in the ring, and having at least two double bonds in the ring such as pyridine and isoquinoline.

The complex of nickel iodide and Lewis base useful as a catalyst in the process of this invention is prepared by the process described in more detail below. If desired, a mixture of nickel iodide and Lewis base may be used as the catalyst system rather than the complex without seriously impairing the catalyst system. For purposes of simplicity the invention will be described below with respect to use of the complex. However, it should be understood that the description is also applicable to mixtures of nickel iodide and Lewis base.

Certain metallic compounds promote the effectiveness of the catalyst system, including oxides of metals of Groups V-A and VI-A of the Periodic Table shown on page 122 of Inorganic Chemistry by Moeller, John Wiley and Sons, Inc., 1952.

Any organic nitro compound capable of being converted to an organic isocyanate may be employed as a reactant. Generally, aromatic, cycloaliphatic, and aliphatic mono- or poly-nitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) Nitrocycloalkanes (a) Nitrocyclobutane
(b) Nitrocyclopentane
(c) Nitrocyclohexane
(d) Dinitrocyclohexanes
(e) Bis(nitrocyclohexyl)methanes (III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes (k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxylalkyl, cyano, isocyanto, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4′-dinitrobiphenyl
(12) 2,4-dinitrobiphenyl
(13) 4,4′-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α′-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-choro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3′-dimethoxy-4,4′-dinitro-biphenyl
(79) 3,3′-dimethyl-4,4′-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy) alkyl ethers. Generally, the organic nitro compounds and substituted organic nitro compounds contain between 1 and about 20 carbon atoms, and preferably between about 6 and about 14 carbon atoms. The more preferred aromatic nitro compounds are nitrobenzene, dinitrotoluene, nitroisocyanatotoluene, and mixtures thereof.

Any Lewis base capable of forming a complex with nickel iodide may be employed. This Lewis base used to prepare the catalyst complex of this invention is preferably a heteroaromatic nitrogen compound containing between five and six members in the ring, containing only nitrogen and carbon in the ring, containing no more than two nitrogen atoms in the ring, and containing at least two double bonds in the ring. Suitable compounds of this type are disclosed in The Ring Index by Patterson and Capell, Second Edition, American Chemical Society, 1960, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic ring of the following type:

(I) Substituents on the ring (a) halides such as chlorine, bromine, iodine and fluorine
(b) alkyl containing between 1 and 40 carbon atoms
(c) aryl such as phenyl, cresyl and xylyl
(d) olefinic such as allyl, vinyl
(e) hydroxy
(f) mercapto
(g) amino
(h) alkylamino
(i) cyano (j) oximino
(k) aldehyde
(l) ethers such as aryl, alkyl, and alkenyl ethers
(m) thioethers such as aryl, alkyl, and alkenyl ethers
(n) carboxy
(o) carbalkoxy
(p) carbamyl
(q) carboaryloxy
(r) thiocarbamyl (II) Polycyclic analogues (a) fused benzene
(b) fused cycloaliphatic
(c) fused nitrogen-containing heteroaromatic (III) Simple salts (IV) Quaternary salts
(V) Oxides
(VI) Complexes with inorganic substances other than noble metal halides
(VII) Mixtures of two or more additions of types I–VI listed below are typical heteroaromatic nitrogen compounds and derivatives thereof which are suitable for use as components of the catalyst complex of this invention.

(1) Five membered ring containing one nitrogen (a) 1-methyl pyrrole
(b) 1-phenyl pyrrole (2) Five membered ring containing two nitrogens (a) imidazole
(b) 1-methyl imidazole
(c) pyrazole (3) Fused benzene and fused nitrogen-containing heteroaromatic derivatives of five membered rings containing one nitrogen (a) indole
(b) indolenine (3-pseudoindole)
(c) 2-isobenzazole
(d) indolizine
(e) 4aH-carbazole
(f) carbazole (4) Six membered ring containing one nitrogen and derivatives thereof (a) pyridine
(b) 2,6-dimethylpyridine
(c) 2,4,6-trimethylpyridine
(d) 4-phenylpyridine
(e) 2-vinylpyridine
(f) 2-styrylpyridine
(g) 2-bromopyridine
(h) 2-chloropyridine
(i) 3-chloropyridine
(j) 2,6-dichloropyridine
(k) 2-bromo-4-methylpyridine
(l) 2-fluoropyridine
(m) 2-allyloxypyridine
(n) 4-phenylthiopyridine
(o) 2-methoxypyridine
(p) picolinic acid
(q) nicotinic acid
(r) 2,6-dicyanopyridine
(s) pyridine-2-aldehyde (picolinaldehyde)
(t) 2-aminopyridine
(u) 4-dimethylaminopyridine
(v) diphenyl-4-pyridylmethane
(w) 4-hydroxypyridine
(x) 2-mercaptopyridine
(y) 2-oximinopyridine (picolinaldoxime)
(z) 4-tertiarybutylpyridine (5) Fused benzene and fused nitrogen-containing heteroaromatic derivatives of six membered ring containing one nitrogen (a) quinoline
(b) 2-chloroquinoline
(c) 8-hydroxyquinoline
(d) isoquinoline
(e) acridine
(f) phenanthridine
(g) 7,8-benzoquinoline
(h) 4H-quinolizine
(i) naphthyridine
(j) carboline
(k) phenanthroline
(l) Benzo[h]isoquinoline
(m) Benzo[g]quinoline
(n) Benzo[g]isoquinoline
(o) Benzo[h]quinoline
(p) Benzo[f]quinoline
(q) Benzo[f]isoquinoline
(r) 1H-benzo[de]quinoline
(s) 4H-benzo[de]quinoline
(t) 4H-benzo[de]isoquinoline
(u) 1H-benzo[de]isoquinoline
(v) purine
(w) adenine
(x) pteridine
(y) 7H-pyrazino[2,3-c]carbazole
(z) Pyrazino[2,3-d]pyridazine
(aa) 4H-pyrido[2,3-c]carbazole
(bb) Pyrido[1',2':1,2]imidazo[4,5-b]quinoxaline
(cc) 6H-perimidine
(dd) perimidine (6) Six membered ring containing two nitrogens and derivatives thereof (a) pyrazine
(b) 4,6-dimethylpyrimidine
(c) 2,6-dimethylpyrazine
(d) pyridazine (7) Fused benzene and fused nitrogen-containing heteroaromatic derivatives of six membered rings containing two nitrogens (a) quinoxaline
(b) 2,3-dimethylquinoxaline
(c) phthalazine
(d) quinazoline
(e) phenazine
(f) cinnoline (8) Simple salts of heteroaromatic nitrogen compounds or derivatives thereof in sections 1–7 above (a) Simple salts include nitrates, hydrohalides, sulfates and acetates of these compounds such as the following:
    (1) pyridine hydrochloride
    (2) 2-chloropyridine-1-oxide hydrochloride
    (3) 4-chloropyridine hydrochloride
    (4) 4,4'-bipyridyl dihydrochloride (9) Quaternary salts of heteroaromatic nitrogen compounds or derivatives thereof of sections 2 and 4–7 above (a) Alkyl halides, where alkyl contains 1–40 carbon atoms, acyl halides, and nitroaryl halides, such as:
    (1) 1-methylquinolinium chloride
    (2) laurylpyridinium chloride
    (3) 1-(4-pyridyl) pyridinium chloride hydrochloride

(10) Oxides of heteroaromatic bases and derivatives thereof of sections 2 and 4–7 above (a) Oxides include oxides of quinoline, pyridine, isoquinoline and imadazole, and are illustrated by the following oxides:
  (1) pyridine-1-oxide
  (2) 4-bromopyridine-1-oxide
  (3) 2-hydroxypyridine-1-oxide
  (4) picolinic acid-1-oxide
  (5) 4-methoxy pyridine-1-oxide
  (6) 2-bromo-6-methylpyridine-1-oxide
  (7) 2-picoline-1-oxide
  (8) 4-picoline-1-oxide

(11) Complexes of heteroaromatic nitrogen compound with inorgainc substances (other than noble metal halides) of sections 2 and 4–7 above.

(a) Complexes include pyridine, quinoline and isoquinoline, complexes illustrated by the following pyridine complexes:
  (1) (pyridine)$_3$·FeCl$_3$
  (2) pyridine·SO$_3$
  (3) pyidine·CrO$_3$
  (4) pyridine·VCl$_3$
  (5) pyridine·V$_2$O$_5$
  (6) pyridine·MoO$_3$ As indicated above, heteroaromatic compounds containing only nitrogen and carbon in the ring are preferably used as the Lewis base, but a heteroaromatic compound which contains only carbon and sulfur or only carbon and oxygen, or carbon and two or more elements selected from the group consisting of nitrogen, sulfur, and oxygen may also be employed as the Lewis base. Typical heteroaromatic compounds, in addition to those mentioned above, include thiophene, dibenzofuran, 2,5-diphenyloxazole, 2-mercatpobenzothiazone, thionaphthene, and the like, may also be used as the Lewis base.

Any convenient technique may be used to prepare a catalyst complex. For example, anhydrous nickel (II) iodide and the Lewis base is refluxed until a solid product is obtained, the excess Lewis base is decanted, the solid product is washed with boiling alcohol, and the resulting solid is separated from the alcohol solution after cooling. This technique is described in Journal of the Americal Chemical Society, vol. 84, pp. 2014–15, (1962).

In another technique for preparing the catalyst complex, nickel nitrate hexahydrate [Ni(NO$_3$)$_2$·6H$_2$O] is admixed with sodium iodide and butanol and the resulting mixture is boiled until substantially all of the water is removed. After cooling, sodium nitrate precipitates, and the resulting solid is separated by filtration or otherwise from the butanol solution of nickel iodide. The Lewis base is added to the resulting nickel iodide solution and then refluxed as described above to form the complex of nickel iodide and Lewis base.

Although the aforesaid catalyst complexes have some effect on improving the yield of isocyanate, certain complexes are significantly more effective than others. Included in these more effective systems are the following nickel iodide complexes:

(1) diiodobis(pyridine)nickel
(2) diiodobis(isoquinoline)nickel
(3) diiodobis(quinoline)nickel The more preferred heteroaromatic compounds are pyridine, isoquinoline, quinoline and mixtures thereof.

The catalyst complex can be self-supported or deposited on a support or carrier for dispersing the catalyst complex to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst complex. The proportion of catalyst complex is generally equivalent to between about 0.001 and about 500 percent, and preferably between about 1 and about 100 percent by weight of the organic nitro compound. However, greater or lesser proportions may be employed if desired.

When a mixture of nickel iodide and Lewis base is employed as a catalyst, the total weight of catalyst component will be within the range described above. The molar ratio of nickel iodide to Lewis base in the mixture is generally in the range between about 1:1 and about 1:10, and preferably about 1:2 and about 1:4.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorofluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 2.0 and about 75 percent, but greater or lesser proportions may be employed if desired.

The order of mixing the reactants is not critical and may be varied within the limitations of the equipment employed. In one embodiment, the organic nitro compound, catalyst complex, and if desired, solvent, is charged to a suitable pressure vessel such as an autoclave which was previously purged with nitrogen, and which is preferably provided with agitation means such as a stirrer or an external rocking mechanism. At startup, carbon monoxide is fed into the autoclave until a pressure is attained, at ambient temperature which is generally between about 30 and about 10,000 p.s.i.g. After the reaction proceeds and heat is applied, the pressure may increase to as high at 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I)  

where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the over all consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction rate may be much faster, i.e. substantially instantaneous, and residence time may be substantially less than batch reaction.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains a nickel iodide complex of the type described above, but also contains a second component comprised of certain metal oxides. Oxides suitable as a second component of the catalyst system include at least one oxide of an element selected from the group consisting of vanadium, molybdenum, tungsten, niobium, chromium and tantalum, as described in copending U.S. patent application Ser. No. 619,158, filed Feb. 28, 1967, for Process, by Wilhelm J. Schnabel, Ehrenfried H. Kober and Theodore C. Kraus. These elements are found in Groups V-A and VI-A of the Periodic Table. Suitable oxides of this type include chromic oxide ($Cr_2O_3$), chromic anhydride ($CrO_3$), chromium monoxide (CrO), chromium dioxide ($CrO_2$); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$); vanadium tetraoxide ($V_2O_4$) and vanadium pentoxide ($V_2O_5$). Mixtures of two or more of these oxides may be employed as one component of the catalyst mixture. The proportion of the second component of the catalyst system, when one is employed, is generally equivalent to a weight ratio of Group V-A or VI-A metal compound to the nickel iodide complex in the catalyst system generally in the range between about 0.0001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLE 1

The reactor employed in these examples was a 100 ml. stainless-steel autoclave (316 grade) adapted to be rocked in a rocker at a rate of about 36 cycles per minute. The reactor was provided with a glass liner, heating coils and means for feeding gas into the gas space to obtain the desired pressure.

A mixture of 2,4-dinitrotoluene, a nickel iodide-quinoline complex [$Ni(C_9H_7N)_2I_2$] and ortho dichlorobenzene was charged to the reactor. The weight of dinitrotoluene was 28 percent, the weight of nickel iodide complex was 9 percent, and the remainder of the charge was ortho dichlorobenzene.

The reactor was sealed and carbon monoxide was fed to the reactor until a pressure of 8000 p.s.i.g. was obtained. The reactor was heated to a temperature of 190° C. for a period of 1.5 hours, with constant rocking during the reaction. At the end of this period, carbon monoxide was released from the autoclave, the temperature was allowed to drop to ambient temperature, the reaction was removed from the autoclave and filtered. The liquid product which was analyzed by vapor phase chromatography, showed a conversion of 37 percent of the dinitrotoluene reactant, and a yield of 5 percent of the product as isocyanate-containing compounds.

EXAMPLE 2

The procedure of Example 1 was repeated with the exception that molybdenum trioxide in an amount equivalent to 2.0 percent was charged with the reaction mixture. Analysis of the reaction product showed a total yield of isocyanate product of 25 percent.

EXAMPLE 3

The procedure of Example 1 was repeated with the exception that the complex was the pyridine complex of nickel iodide, $Ni(C_5H_5N)_2I_2$. The total yield of isocyanate products was 5 percent.

EXAMPLES 4–5

The procedure of Examples 1 and 3 are repeated with the exception that a mixture of nickel iodide and quinoline in stoichiometric proportions (Example 4) and a mixture of nickel iodide and pyridine in stoichiometric proportions (Example 5) were used as the catalyst system. Similar yields of isocyanate product were obtained.

Various modifications of the invention, some of which have been referred to above, may be employed without departing from the spirit of the invention.

What is desired to be secured by Letters Patent is:

1. In the process for preparing an aromatic isocyanate by reacting an aromatic nitro compound with carbon monoxide at an elevated temperature and an elevated pressure in the presence of a catalyst, the improvement which comprises employing as said catalyst, a catalyst based on nickel iodide and a Lewis base,
   (A) wherein said Lewis base is selected from the group consisting of
      (1) a heteroaromatic nitrogen compound containing
         (a) 5 or 6 members in the ring,
         (b) only nitrogen and carbon in the ring,
         (c) no more than two nitrogen atoms in the ring, and
         (d) at least two double bonds in the ring.

2. The process of claim 1 wherein the molar ratio of nickel iodide to said Lewis base is between about 1:1 and about 1:10.

3. The process of claim 2 wherein the proportion of said catalyst is between about 0.001 and about 500 percent by weight of said aromatic nitro compound.

4. The process of claim 3 wherein said catalyst is a mixture of nickel iodide and said Lewis base.

5. The process of claim 4 wherein said Lewis base is selected from the group consisting of pyridine, isoquinoline, quinoline and mixtures thereof.

6. The process of claim 5 wherein the molar ratio of nickel iodide to said Lewis base is in the range between about 1:2 and 1:4 and the proportion of said catalyst is between about 1 and about 100 percent by weight of said aromatic nitro compound.

7. The process of claim 6 wherein said aromatic nitro compound is selected from the group consisting of nitrobenzene, dinitrotoluene, nitroisocyanatotoluene and mixtures thereof.

8. The process of claim 3 wherein said catalyst is a complex of nickel iodide and said Lewis base.

9. The process of claim 8 wherein the proportion of said catalyst is in the range between about 1 and about 100 percent by weight of said aromatic nitro compound.

10. The process of claim 9 wherein said aromatic nitro compound is selected from the group consisting of nitrobenzene, dinitrotoluene, nitroisocyanatotoluene, and mixtures thereof.

11. The process of claim 10 wherein said catalyst is diiodobis(pyridine)nickel.

12. The process of claim 10 wherein said catalyst is diiodobis(quinoline)nickel.

13. The process of claim 10 wherein said catalyst is diiodobis(isoquinoline)nickel.

References Cited

UNITED STATES PATENTS

| 3,405,156 | 10/1968 | Stern et al. | 260—453 |
| 3,461,149 | 8/1969 | Hardy et al. | 260—453 |
| 3,481,967 | 12/1969 | Ottmann et al. | 260—453 |

OTHER REFERENCES

Edwin S. Gould: Inorganic Reactions and Structure, pp. 241–2, Holt, Rinhart and Winston, New York (1962).

CHARLES B. PARKER, Primary Examiner

D. H. TORRENCE, Assistant Examiner

U.S. Cl. X.R.

252—429R, 429C; 260—242, 243A, 270R, 299, 313.1, 315, 319.1, 326.1, 476